(12) United States Patent
Shimizu et al.

(10) Patent No.: US 12,651,358 B2
(45) Date of Patent: Jun. 9, 2026

(54) CAMERA MOTION INFORMATION BASED THREE-DIMENSIONAL (3D) RECONSTRUCTION

(71) Applicant: SONY GROUP CORPORATION, Tokyo (JP)

(72) Inventors: Hideyuki Shimizu, Tokyo (JP); James Kuch, Wheaton, IL (US); Nikolaos Georgis, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 773 days.

(21) Appl. No.: 17/328,975

(22) Filed: May 24, 2021

(65) Prior Publication Data

US 2022/0114740 A1 Apr. 14, 2022

Related U.S. Application Data

(60) Provisional application No. 63/089,932, filed on Oct. 9, 2020.

(51) Int. Cl.
G06T 7/292 (2017.01)
G06F 18/24 (2023.01)
(Continued)

(52) U.S. Cl.
CPC .............. G06T 7/292 (2017.01); G06F 18/24 (2023.01); G06N 3/08 (2013.01); G06T 7/344 (2017.01);
(Continued)

(58) Field of Classification Search
CPC .. G06T 7/20; G06T 7/292; G06T 7/80; G06T 7/97; G06T 7/344; G06T 15/08; G06T 5/205; G06T 17/10; G06T 2207/20081; G06T 2207/20084; G06T 7/579; G06T 3/0068; G06T 2207/30168; G06T 17/00;
(Continued)

(56) References Cited

U.S. PATENT DOCUMENTS 7,991,222 B2 8/2011 Dimsdale et al.
2012/0306999 A1* 12/2012 Zhou .................... H04N 5/2624
348/E5.031
(Continued)

FOREIGN PATENT DOCUMENTS

WO 2014/133689 A1 9/2014

*Primary Examiner* — Vincent Rudolph
*Assistant Examiner* — Timothy Choi
(74) *Attorney, Agent, or Firm* — CHIP LAW GROUP

(57) ABSTRACT

An electronic device and method for three-dimensional (3D) reconstruction based on camera motion information is provided. The electronic device receives a set of images of a three-dimensional (3D) physical space captured by one or more image sensors. The electronic device further receives metadata associated with each of the set of images. The metadata may include at least motion information associated with the one or more image sensors that captured the set of images. The electronic device applies a neural network model on the received metadata. The electronic device determines a first set of images from the received set of images based on the application of the neural network model on the received metadata. The electronic device constructs a 3D model of a subject associated with the 3D physical space based on the determined first set of images.

18 Claims, 5 Drawing Sheets

(51) Int. Cl.

| | |
|---|---|
| *G06N 3/0464* | (2023.01) |
| *G06N 3/08* | (2023.01) |
| *G06T 7/33* | (2017.01) |
| *G06T 7/579* | (2017.01) |
| *G06T 15/08* | (2011.01) |
| *G06T 15/20* | (2011.01) |
| *G06T 17/00* | (2006.01) |
| *G06T 17/10* | (2006.01) |
| *G06V 10/82* | (2022.01) |
| *G06V 20/64* | (2022.01) |
| *H04N 23/73* | (2023.01) |

(52) U.S. Cl.

CPC ............. *G06T 7/579* (2017.01); *G06T 15/08* (2013.01); *G06T 15/205* (2013.01); *G06T 17/10* (2013.01); *H04N 23/73* (2023.01); *G06N 3/0464* (2023.01); *G06T 17/00* (2013.01); *G06T 2207/20081* (2013.01); *G06T 2207/20084* (2013.01); *G06V 10/82* (2022.01); *G06V 20/64* (2022.01)

(58) Field of Classification Search

CPC .......... G06F 18/24; G06N 3/08; G06V 10/82; G06V 20/64

See application file for complete search history.

(56) References Cited

U.S. PATENT DOCUMENTS

| | | | | |
|---|---|---|---|---|
| 2013/0051516 | A1 | 2/2013 | Yang et al. | |
| 2015/0049170 | A1* | 2/2015 | Kapadia | G06T 17/00 348/46 |
| 2017/0280130 | A1* | 9/2017 | Burton | H04N 13/156 |
| 2017/0353666 | A1* | 12/2017 | Numata | H04N 23/80 |
| 2018/0232878 | A1* | 8/2018 | Braun | G06T 7/20 |
| 2019/0147220 | A1* | 5/2019 | Mccormac | G06V 10/7715 382/103 |
| 2020/0265567 | A1* | 8/2020 | Hu | G06N 3/09 |
| 2020/0267314 | A1* | 8/2020 | Sivan | H05K 999/99 |
| 2020/0314331 | A1* | 10/2020 | Ouchi | G06N 3/08 |
| 2021/0142497 | A1* | 5/2021 | Pugh | G06T 19/006 |

* cited by examiner

FIG. 1

CAMERA MOTION INFORMATION BASED THREE-DIMENSIONAL (3D) RECONSTRUCTION

CROSS-REFERENCE TO RELATED APPLICATIONS/INCORPORATION BY REFERENCE

This application claims priority to U.S. Provisional Patent Application Ser. No. 63/089,932 filed on Oct. 9, 2020, the entire content of which is hereby incorporated herein by reference.

FIELD

Various embodiments of the disclosure relate to three-dimensional (3D) reconstruction. More specifically, various embodiments of the disclosure relate to an electronic device and method for three-dimensional (3D) reconstruction based on camera motion information.

BACKGROUND

Advancements in the field of computer graphics and image processing have provided techniques to create three-dimensional (3D) models of a real object (such as animate object or inanimate object). Typically, a 3D model corresponds to a mathematical coordinate-based representation of a surface of the object in three dimensions. These 3D models are increasingly being used in animated movies, games, augmented-reality, virtual-reality, and mixed-reality systems to enhance user experience. In certain scenarios, such 3D models may be generated from multiple two-dimensional (2D) images or video frames of the object that are captured by using one or more image capture devices from different viewpoints. To capture the 2D images of high quality, specific settings for the one or more image capture devices, such as, a slow shutter speed (for a long exposure time) and a low ISO sensitivity may be used. However, such settings (such as slow shutter speed) may require the one or more image capture devices to be stationary to obtain 2D images without noticeable blurring. This may impose certain limitations during the capture of the 2D images, such as, use of a camera support (for example, a tripod) for the one or more image capture devices. In certain scenarios, the one or more image capture devices may be required to be mobile (or in continuous motion), which may produce noticeable blurring in the 2D images and may thus impact the quality of the captured 2D images. As a result, the quality of the 3D models obtained from these captured 2D images may be low. Furthermore, existing techniques for generation of the 3D models require complex algorithms for the alignment of the 2D images obtained from the one or more image capture devices.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for three-dimensional (3D) reconstruction based on camera motion information is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 1 is a diagram that illustrates a network environment for three-dimensional (3D) reconstruction based on camera motion information, in accordance with an embodiment of the disclosure.

DETAILED DESCRIPTION

Figure 2:
FIG. 2 is a block diagram that illustrates an exemplary electronic device for three-dimensional (3D) reconstruction based on camera motion information, in accordance with an embodiment of the disclosure.
Figure 2:
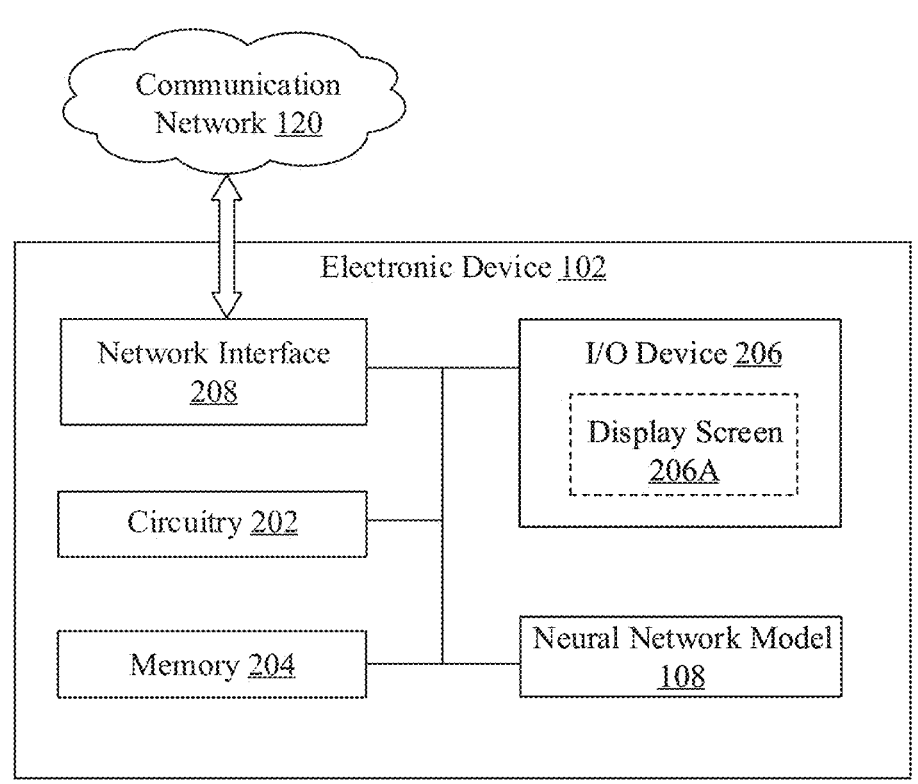

The following described implementations may be found in a disclosed electronic device and a method for three-dimensional (3D) reconstruction based on camera motion information. The electronic device may receive a set of images of a three-dimensional (3D) physical space captured by one or more image sensors (such as cameras). The electronic device may further receive metadata associated with each of the set of images. The metadata may include motion information (such as motion vectors) associated with the one or more image sensors that captured the set of images. The electronic device may further apply a neural network model on the received metadata associated with each of the set of images. The neural network model may be trained to classify a first image from the set of images into one of a first quality image or a second quality image based on the metadata corresponding to the first image. The electronic device may further determine a first set of images from the received set of images based on the application of the neural network model on the received metadata associated with each of the set of images. Each of the determined first set of images may be classified as the first quality image. The electronic device may further construct a 3D model of a subject (such as an animate object or an inanimate object) associated with the 3D physical space based on the determined first set of images.

The electronic device may automatically determine the first set of images from the received set of images by the application of the neural network model on the corresponding metadata associated with each of the set of images. For example, the metadata may include the motion information determined by one or more inertial measurement units (IMUs) (such as a gyroscope) associated with the one or more image sensors at the time of capture of the set of images. The metadata may be provided as an input to the neural network model. The neural network model may classify the corresponding image of the set of images into one of the first quality image or the second quality image by comparison of the motion information with a motion threshold. For example, the first quality image may be based on a rate of motion of the first image sensor being below a motion threshold. The second quality image may be based on the rate of motion of the first image sensor being above the motion threshold. Accordingly, the first quality image may include a lower amount of blur compared to the second quality image. The electronic device may construct the 3D model of the subject based on the first set of images corresponding to the first quality image, to thereby generate the 3D model of a higher quality compared to a 3D model that may be generated from the received set of images (including a second set of images classified as the second quality image).

The electronic device may construct the 3D model by elimination of the second set of images corresponding to the second quality image in the construction of the 3D model, to thereby generate an accurate 3D model irrespective of the motion of the one or more image sensors at the time of capture of the set of images. The electronic device may improve signal-to-noise (SNR) ratio in the construction of the 3D model in scenarios where the one or more image sensors may be in continuous motion, and where the set of images have been captured with specific settings, such as, slow shutter speed and low ISO sensitivity. The electronic device may extract the first set of images that have the rate of motion lower than the motion threshold from the received set of images, and may construct the 3D model of the subject from the extracted first set of images, such that the quality of the constructed 3D model may be better in comparison to the quality of a 3D model constructed using the received set of images. Furthermore, the electronic device may align the set of images from the one or more image sensors for the generation of the 3D model based on the motion information (such as motion vectors) from the IMUs, thereby eliminating the need for complex algorithms or manual alignment that may be time-consuming, cumbersome, and subject to human errors.

Figure 1:
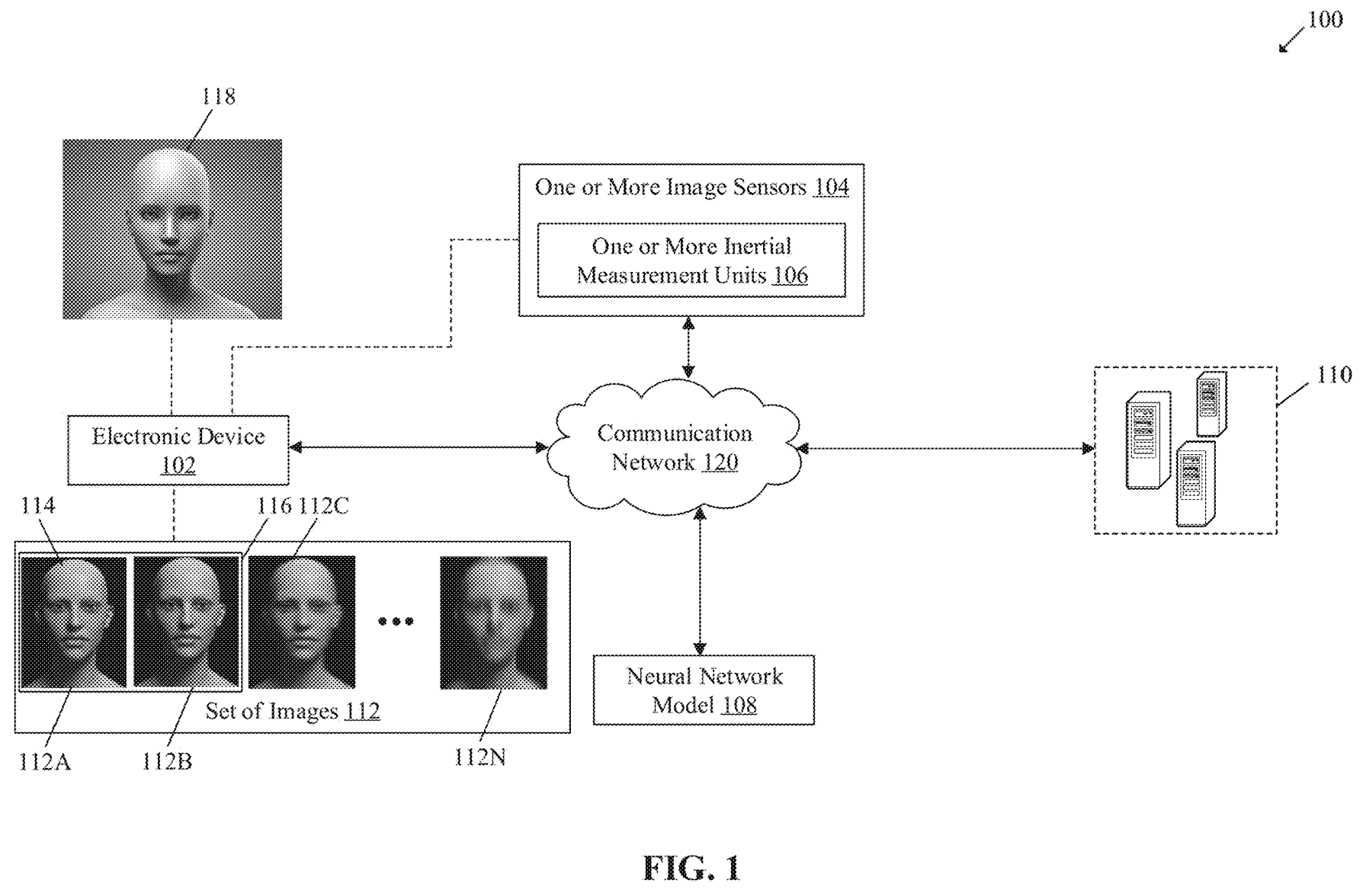

FIG. 1 is a diagram that illustrates a network environment for three-dimensional (3D) reconstruction based on camera motion information, in accordance with an embodiment of the disclosure. With reference to FIG. 1, there is shown a network environment 100. In the network environment 100, there is shown an electronic device 102, and one or more image sensors 104 that may include one or more inertial measurement units (IMUs) 106. In the network environment 100, there is further shown a neural network (NN) model 108, and a server 110. The one or more image sensors 104 may capture a set of images 112 of a 3D physical space that may include a subject 114. With reference to FIG. 1, there is further shown a first set of images 116, and a three-dimensional (3D) model 118 of the subject 114. The electronic device 102, the one or more image sensors 104, the NN model 108, and the server 110 may communicate with each other via a communication network 120.

The electronic device 102 may include suitable logic, circuitry, interfaces, and/or code that may be configured to construct the 3D model 118 of the subject 114 associated with the 3D physical space based on the set of images 112 of the 3D physical space. The electronic device 102 may apply the NN model 108 to determine the first set of images 116 from the received set of images 112, and may construct the 3D model 118 based on the determined first set of images 116. Examples of the electronic device 102 may include, but are not limited to, a 3D modelling or simulation engine, a computing device, a volumetric capture controller, a volumetric studio controller, a three-dimensional (3D) graphic engine, a mainframe machine, a server, a computer workstation, a smartphone, a cellular phone, a mobile phone, a gaming device, a consumer electronic (CE) device and/or any other device with image processing capabilities. In an implementation, the electronic device 102 may be installed in a rig that may include the one or more image sensors 104, one or more light sources, and/or one or more audio capture devices. The one or more image sensors 104 may be movable along a body of the rig to capture the subject 114 that may be in motion. The rig may be movable to move the one or more image sensors 104 concurrently to capture the subject 114 that may be in motion.

Each of the one or more image sensors 104 may include suitable logic, circuitry, and interfaces that may be configured to capture the set of images 112 of the 3D physical space. For example, each of the one or more image sensors 104 may be configured to capture the set of images 112 (such as two-dimensional images from different viewpoints) of the subject 114 in the 3D physical space. Each of the one or more image sensors 104 may be further configured to transmit the captured set of images 112 to the electronic device 102. Each of the one or more image sensors 104 may have an associated inertial measurement unit (IMU) 106. The one or more image sensors 104 may be installed on a rig, and may be controllably movable in one or more directions to follow the movement of the subject 114. Examples of each of the one or more image sensors 104 may include, but are not limited to, an image sensor, a wide-angle camera, an action camera, a closed-circuit television (CCTV) camera, a camcorder, a digital camera, an event camera, a movie camera, a stereo camera, a camera phone, a time-of-flight camera (ToF camera), a night-vision camera, and/or other image capture devices.

Each of the one or more inertial measurement units (IMUs) 106 may include suitable logic, circuitry, and interfaces that may be configured to measure a rate of motion of the corresponding image sensor of the one or more image sensors 104. For example, the rate of motion measure by the IMU 106 may include a speed of motion of the corresponding image sensor, a direction of motion of the corresponding image sensor, changes in an attitude or orientation (such as pitch, yaw, and roll) of the corresponding image sensor, an acceleration, a specific force, an angular velocity, or any other motion parameter associated with the corresponding image sensor. The rate of motion of the corresponding image sensor captured by the IMU 106 at the time of capture of the first image 112A may be stored as metadata associated with the first image 112A. Although the rate of motion is described as an example of the metadata acquired from the IMUs 106, the disclosure is not so limited, and the metadata for classification of the set of images 112 may include other parameters that may indicate blurring of images, without departing from the scope of the disclosure. In an embodiment, the IMU 106 may be integrated with each of the one or more image sensors 104. In an embodiment, the IMU 106 may be separated from each of the one or more image sensors 104. Examples of the IMU 106 may include, but are not limited to, a motion sensor, a gyroscope, a microelectromechanical systems (MEMS) gyroscope, an accelerometer, a magnetometer, a pressure sensor, and/or a combination thereof.

The neural network (NN) model 108 (such as a convolutional neural network or a recurrent neural network) may be defined by its hyper-parameters, for example, activation function(s), number of weights, cost function, regularization function, input size, number of layers, and the like. The NN model 108 may be a computational network or a system of artificial neurons, arranged in a plurality of layers, as nodes. The plurality of layers of the NN model 108 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the NN model 108. Outputs of each hidden layer may be coupled to inputs of at least one node in other layers of the NN model 108. Node(s) in the final layer may receive inputs from at least one hidden layer to output a result. The number of layers and the number of nodes in each layer may be determined from hyper-parameters of the NN model 108. Such hyper-parameters may be set before, while training, or after training the NN model 108 on a training dataset (such as images and associated motion information).

Each node of the NN model 108 may correspond to a mathematical function (e.g., a sigmoid function or a rectified linear unit) with a set of parameters, tunable during training of the NN model 108. The set of parameters may include, for example, a weight parameter, a regularization parameter, and the like. Each node may use the mathematical function to compute an output based on one or more inputs from nodes in other layer(s) (e.g., previous layer(s)) of the NN model 108. All or some of the nodes of the NN model 108 may correspond to the same or a different mathematical function.

In accordance with an embodiment, the electronic device 102 may train the NN model 108 on one or more features related to the set of images 112 and associated metadata (for example, the motion information associated with the one or more image sensors 104) to obtain the trained NN model 108. The NN model 108 may be trained to classify each image of the set of images 112 into one of the first quality image or the second quality image. The one or more features may include at least one of a motion vector associated with the one or more image sensors 104, a set of imaging parameters related to the one or more image sensors 104, one or more motion thresholds associated with different amounts of blurring, and so on. For example, the electronic device 102 may input several images from the one or more image sensors 104 and associated motion information from the IMUs 106 to the NN model 108 to train the NN model 108. For example, the images may include images of different qualities (such as the first quality image, the second quality image, etc.) with respect to the motion threshold.

In training of the NN model 108, one or more parameters of each node of the NN model 108 may be updated based on whether an output of the final layer for a given input (from the training dataset) matches a correct result based on a loss function for the NN model 108. The above process may be repeated for the same or a different input till a minima of loss function may be achieved, and a training error may be minimized. Several methods for training are known in art, for example, logistic regression, naive bayes, K-Nearest Neighbours, decision trees, random forest, support vector machine, gradient descent, stochastic gradient descent, batch gradient descent, gradient boost, meta-heuristics, and the like.

The NN model 108 may include electronic data, which may be implemented as, for example, a software component of an application executable on the electronic device 102.

The NN model 108 may rely on libraries, external scripts, or other logic/instructions for execution by a processing device, such as circuitry. The NN model 108 may include code and routines configured to enable a computing device, such as the circuitry to perform one or more operations for classification of the set of images 112 into the first set of images 116 and a second set of images. Additionally or alternatively, the NN model 108 may be implemented using hardware including a processor, a microprocessor (e.g., to perform or control performance of one or more operations), a field-programmable gate array (FPGA), or an application-specific integrated circuit (ASIC). Alternatively, in some embodiments, the NN model 108 may be implemented using a combination of hardware and software. Examples of the NN model 108 may include, but are not limited to, a deep neural network (DNN), a convolutional neural network (CNN), an artificial neural network (ANN), and/or a combination of such networks. In certain embodiments, the NN model 108 may be based on a hybrid architecture of multiple deep neural networks (DNNs).

The server 110 may include suitable logic, circuitry, and interfaces, and/or code that may be configured to store the received set of images 112. The server 110 may be further configured to train and store the NN model 108. The server 110 may be further configured to generate training data for the NN model 108. The server 110 may be further configured to transmit the NN model 108 along with the training data to the electronic device 102. In an embodiment, the server 110 may be configured to store a motion threshold, a shutter speed threshold, an exposure threshold, an ISO sensitivity threshold, and a gain threshold associated with the one or more image sensors 104. The server 110 may be implemented as a cloud server and may execute operations through web applications, cloud applications, HTTP requests, repository operations, file transfer, and the like. Other example implementations of the server 110 may include, but are not limited to, a database server, a file server, a web server, a media server, an application server, a mainframe server, or a cloud computing server.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the electronic device 102 as two separate entities. In certain embodiments, the functionalities of the server 110 can be incorporated in its entirety or at least partially in the electronic device 102, without departing from the scope of the disclosure.

The subject 114 may be an animate object or an inanimate object, and may be present in the 3D physical space captured by the one or more image sensors 104. The animate object may correspond to a living object that may possess a quality or an ability of motion, whereas the inanimate object may correspond to a non-living object that may lack the quality or the ability of motion. The subject 114 may be mobile or stationary. The subject 114 may exist in any state of matter, such as, solid, liquid, gas, or plasma. Examples of the subject 114 may include, but are not limited to, a human, an animal, a bird, a plant, or any non-living object (such as, but not limited to, a food item, a musical instrument, a sports object, a furniture item, and so forth).

The 3D model 118 may be a 3D graphical model that may resemble the actual shape of the subject 114. Typically, the 3D model 118 of the subject 114 may be rendered from a 3D mesh that may use polygonal surfaces to define a shape and geometry of the subject 114. The 3D model of the subject 114 may realistically represent the surface features of the subject 114. The 3D model of the subject 114 may be a solid model that define the volume of the subject 114, or may be a shell model that represent the surface or boundary of the subject 114. The 3D model of the subject 114 may be constructed using a set of 2D images captured by the one or more image sensors 104. The 3D model of the subject 114 may be represented using various modeling techniques, such as, polygonal modeling, curve modeling, or digital sculpting, etc. In an example, the 3D model of the subject 114 may be represented in terms of voxels. In some exemplary scenarios, the 3D model 118 may be rendered in a virtual reality (VR) or augmented reality (AR) environment to represent the subject 114. The application of the 3D model 118 may include animations in video games, visual effects (VFX), computer-generated imagery (CGI), simulation, and 3D model-based video conferencing.

The communication network 120 may include a communication medium through which the electronic device 102, the one or more image sensors 104, and the server 110 may communicate with each other. The communication network 120 may be one of a wired connection or a wireless connection. Examples of the communication network 120 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive a request to construct the 3D model 118 of the subject 114 associated with the 3D physical space. Based on the reception of the request, the electronic device 102 may be configured to control the one or more image sensors 104 to capture the set of images 112 of the subject 114. To construct the 3D model, the one or more image sensors 104 may capture the set of images 112 of the subject 114 from multiple viewpoints. The set of images 112 may include, but is not limited to, the first image 112A, a second image 1128, a third image 112C, and an Nth image 112N. Although FIG. 1 illustrates the set of images 112 from a single viewpoint, it may be noted that each image sensor of the one or more image sensors 104 may capture the set of images 112 from a different viewpoint, resulting in multiple sets of images 112 from different viewpoints. The one or more image sensors 104 may be in motion during the capture of the set of images 112, and as a result, one or more images from the set of images 112 may have noticeable blurring due to the motion of the image sensor that captured the one or more images. As depicted in FIG. 1, the third image 112C and the Nth image 112N may be blurred.

During the capture of each of the set of images 112, the corresponding image sensor of the one or more image sensors 104 may store metadata associated with each of the captured images (such as the first image 112A, the second image 1128, the third image 112C, and the Nth image 112N).

The metadata associated with the corresponding image may be extracted from the IMU 106 associated with the corresponding image sensor 104. The metadata may include motion information associated with the one or more image sensors 104 that captured the set of images 112. The motion information may indicate a rate of motion of the corresponding image sensor 104, at a time of capture of the corresponding image by the corresponding image sensor 104. For example, the motion information may indicate a rate of motion of a first image sensor of the one or more image sensors 104, at the time of capture of the first image 112A by the first image sensor. In some embodiments, the metadata may include information related to a set of imaging parameters (such as shutter speed, ISO sensitivity value, exposure value) associated with the one or more image sensors 104. The details about the set of imaging parameters are provided, for example, in FIG. 3.

Based on the capture of the set of images 112 and the metadata, the one or more image sensors 104 may transmit the captured set of images 112 along with the metadata associated with each of the set of images 112 to the electronic device 102. The electronic device 102 may receive the captured set of images 112 from the one or more image sensors 104. The electronic device 102 may also receive the metadata associated with each of the set of images 112 from the one or more IMUs 106 associated with the one or more image sensors 104.

Based on the reception of the set of images 112 and the metadata associated with each of the set of images 112, the electronic device 102 may be further configured to apply the NN model 108 on the received metadata associated with each of the set of images 112. The NN model 108 may be trained to classify each image of the set of images 112 into one of a first quality image or a second quality image, based on the metadata associated with the corresponding image. For example, the NN model 108 may be configured to compare the motion information (such as the rate of motion) of the corresponding image sensor 104 with a motion threshold. The electronic device 102 may further classify each image of the set of images 112 into one of the first quality image or the second quality image based on the comparison. The details about the comparison are provided, for example, in FIGS. 3 and 4.

The electronic device 102 may further determine the first set of images 116 from the received set of images 112 based on the application of the NN model 108 on the received metadata associated with each of the set of images 112. Each of the determined first set of images 116 may be classified as the first quality image. For example, the first image 112A and the second image 112B may be classified as the first quality image, whereas the third image 112C and the Nth image 112N may be classified as the second quality image. For example, the first set of images 116 may include the first image 112A and the second image 112B. For example, the first quality image may be based on the rate of motion of the first image sensor of the one or more image sensors 104 being lower than the motion threshold. The second quality image may be based on the rate of motion of the first image sensor of the one or more image sensors 104 being greater than the motion threshold. Accordingly, the first quality image may include a lower amount of blur compared to the second quality image.

Based on the determination of the first set of images 116, the electronic device 102 may be configured to construct the 3D model 118 of the subject 114. The constructed 3D model 118 of the subject 114 may be rendered on a display device associated with the electronic device 102. The details of the construction and rendering of the 3D model 118 are provided, for example, in FIG. 3. The electronic device 102 may construct the 3D model 118 of the subject 114 based on the first set of images 116 (such as the first image 112A and the second image 112B) corresponding to the first quality image, to thereby generate the 3D model 118 of a higher quality compared to a 3D model that may be generated from the received set of images 112 (including the third image 112C and the Nth image 112N classified as the second quality image). The electronic device 102 may construct the 3D model 118 by elimination of the second set of images (such as the third image 112C and the Nth image 112N) corresponding to the second quality image, to thereby generate an accurate 3D model irrespective of the motion of the one or more image sensors 104 at the time of capture of the set of images 112. The electronic device 102 may improve signal-to-noise (SNR) ratio in the construction of the 3D model 118 in scenarios where the one or more image sensors 104 may be in continuous motion, and where the set of images have been captured with specific settings, such as, slow shutter speed and low ISO sensitivity.

In an embodiment, the electronic device 102 may identify a second image, corresponding to the first image, from the set of images based on the application of the NN model 108 on the received metadata associated with each of the set of images 112. The electronic device 102 may obtain the second image from a second image sensor of the of the one or more image sensors 104. In an example, the first image and the second image may be images of the subject 114 from different viewpoints. The electronic device 102 may align the identified second image with the first image based on a first metadata associated with the first image and a second metadata associated with the second image. The electronic device 102 may automatically align the set of images 112 from the one or more image sensors 104 for the generation of the 3D model 118 based on the motion information (such as motion vectors) from the IMUs 106, thereby eliminating the need for complex algorithms or manual alignment that may be time-consuming, cumbersome, and subject to human errors.

Although in FIG. 1, the one or more image sensors 104 and the NN model 108 is shown separated from the electronic device 102, the disclosure is not so limited. Accordingly, in some embodiments, the one or more image sensors 104 and the NN model 108 may be integrated in the electronic device 102, without deviation from scope of the disclosure.

FIG. 2 is a block diagram that illustrates an exemplary electronic device for three-dimensional (3D) reconstruction based on camera motion information, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. With reference to FIG. 2, there is further shown a display screen 206A, and the NN model 108. The circuitry 202 may be communicatively coupled to the memory 204, the I/O device 206, and the network interface 208.

The circuitry 202 may comprise suitable logic, circuitry, and interfaces that may be configured to execute instructions stored in the memory 204. The instructions may correspond to a set of image processing operations for application of the NN model 108 on received metadata, classification of each image from the set of images into one of a first quality image or a second quality image based on the metadata, determination of a first set of images 116 (classified as the first quality image) from the received set of images, and construction of the 3D model of the subject 114 in the 3D physical space based on the determined first set of images 116. The circuitry 202 may be implemented based on a number of processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the program instructions executable by the circuitry 202. Additionally, the memory 204 may store the set of images 112, the metadata (such as motion vectors from the one or more IMUs 106) associated with each of the set of images 112, the first set of images 116, and image capture settings (such as shutter speed, ISO sensitivity value, exposure value) used to capture each of the set of images 116. In at least one embodiment, the memory 204 may store the NN model 108 and the training data obtained from the server 110. In another embodiment, the memory 204 may further store information regarding the motion threshold, a shutter speed threshold, an exposure threshold, an ISO sensitivity threshold, and a gain threshold associated with the one or more image sensors 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between a user (such as a 3D modeler) and the electronic device 102. The I/O device 206 may be configured to receive a user input to construct the 3D model 118 of the subject 114 associated with the 3D physical space. In some embodiments, the I/O device 206 may be configured to display the constructed 3D model 118. The I/O device 206 may comprise various input and output devices, which may be configured to communicate with different operational components of the electronic device 102. Examples of the I/O device 206 may include, but are not limited to, a touch screen, a keyboard, a mouse, a joystick, a microphone, and a display screen (for example, the display screen 206A).

The display screen 206A may comprise suitable logic, circuitry, and interfaces that may be configured to display the constructed 3D model 118 of the subject 114. In an embodiment, the display screen 206A may further display information about the first quality image and the second quality image. In some embodiments, the display screen 206A may be an external display device associated with the electronic device 102. The display screen 206A may be a touch screen which may receive the user input via display screen 206A. The touch screen may be at least one of a resistive touch screen, a capacitive touch screen, or a thermal touch screen. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may comprise suitable logic, circuitry, interfaces, and/or code that may be configured to establish communication between the electronic device 102, the one or more image sensors 104, and the server 110, via the communication network 120. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The functions or operations executed by the electronic device 102, as described in FIG. 1, may be performed by the circuitry 202. Operations executed by the circuitry 202 are described in detail, for example, in FIGS. 3, 4, and 5.

Figure 3:
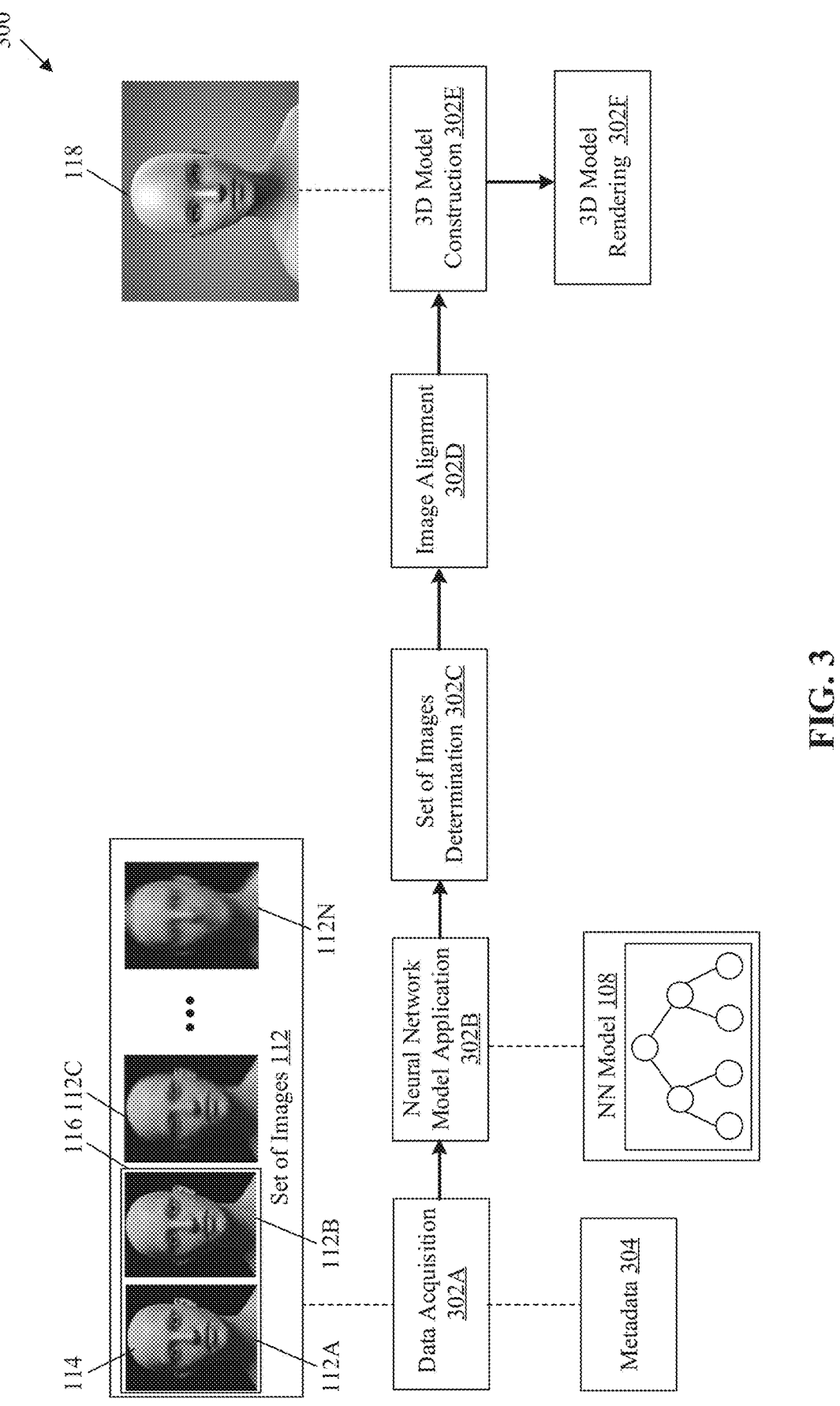
FIG. 3 is a diagram that illustrates exemplary operations for three-dimensional (3D) reconstruction based on camera motion information, in accordance with an embodiment of the disclosure.

FIG. 3 is a diagram that illustrates exemplary operations for three-dimensional (3D) reconstruction based on camera motion information, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302F, as described herein. The exemplary operations illustrated in the block diagram 300 may start at 302A and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302A, data acquisition may be performed. In the data acquisition, the circuitry 202 may receive the set of images 112 of a three-dimensional (3D) physical space from the one or more image sensors 104. In an embodiment, the circuitry 202 may control the one or more image sensors 104 to capture the set of images 112 of the 3D physical space from multiple viewpoints. In another embodiment, the circuitry 202 may be configured to control a set of imaging parameters related to the one or more image sensors 104. The set of imaging parameters may include at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter. For example, the circuitry 202 may set a value of one or more imaging parameters of the set of imaging parameters.

For example, the circuitry 202 may set a value of a shutter speed parameter associated with the one or more image sensors 104 to be slower than the shutter speed threshold. The circuitry 202 may set a value of an exposure parameter associated with the one or more image sensors 104 to be greater than the exposure threshold. In another example, the circuitry 202 may set a value of an ISO sensitivity parameter associated with the one or more image sensors 104 to be less than the ISO sensitivity threshold. In another example, the circuitry 202 may set a value of a gain parameter associated with the one or more image sensors 104 to be less than the gain threshold.

In an embodiment, the 3D physical space may include the subject 114. The one or more image sensors 104 may capture the set of images 112 of the subject 114 in the 3D physical space. In some embodiments, the circuitry 202 of the electronic device 102 may transmit a command, via the communication network 120, to the one or more image sensors 104 to capture the set of images 112. Concurrent to the reception of the set of images 112, the circuitry 202 may be configured to receive metadata 304 associated with each of the set of images 112. The metadata 304 may include motion information (such as motion vectors) associated with the one or more image sensors 104 that captured the set of images 112. The metadata 304 associated with each of the set of images 112 may be determined by one or more IMUs 106 associated with the one or more image sensors 104. The metadata 304 may include motion values captured by the one or more IMUs 106 at the time of capture of the corresponding image of the set of images 112. In an example, the motion information may indicate a rate of motion (such as acceleration, direction of movement, angular velocity) of the first image sensor from the one or more image sensors 104, at a time of capture of the first image 112A by the first image sensor. In another example, the motion information may include one or more motion vectors from the one or more IMUs 106 corresponding to specific force, angular rate, and change in attitude or orientation (such as yaw, pitch, and roll) of the first image sensor from the one or more image sensors 104, at the time of capture of the first image 112A by the first image sensor.

In another embodiment, the metadata 304 may also include information related to the set of imaging parameters associated with each of the one or more image sensors 104. For example, the metadata 304 may also include a value of one or more imaging parameters of the set of imaging parameters at the time of capture of the corresponding image of the set of images 112.

In an embodiment, the metadata 304 may include a value of the shutter speed parameter associated with the one or more image sensors 104. The shutter speed parameter may correspond to a length of time for which a shutter of the corresponding image sensor 104 is open, to expose incident light onto the corresponding image sensor 104. In another embodiment, the metadata 304 may include a value of an exposure parameter associated with the one or more image sensors 104. The exposure parameter may correspond to an amount of light per unit area that may be incident on the corresponding image sensor. In another embodiment, the metadata 304 may include a value of an ISO sensitivity parameter associated with the one or more image sensors 104. The ISO sensitivity parameter may be a measure of an ability of the corresponding image sensor 104 to capture light. In another embodiment, the metadata 304 may further include a value of a gain parameter associated with the one or more image sensors 104. The gain parameter may correspond to a magnitude of amplification that the corresponding image sensor 104 may produce. The gain parameter may correspond to an amount of amplification in decibels that the corresponding image sensor 104 may apply to a sensor signal before the sensor signal is recorded. The received metadata 304 may be stored in the memory 204 of the electronic device 102.

At 302B, a neural network (NN) model (such as the NN model 108) may be applied. The circuitry 202 may be configured to apply the NN model 108 on the received metadata 304 associated with each of the set of images 112. The NN model 108 may be a classifier that may assign a class label from a set of class labels to each of the set of images 112. The NN model 108 may be trained to classify each of the set of images 112 into either a first quality image or a second quality image based on a motion threshold. The first quality image may include a lower amount of blur compared to the second quality image. The first quality image may be higher in quality compared to the second quality image in terms of amount of blurring, resolution, or other image quality parameters.

In an embodiment, the NN model 108 may compare the motion information in the metadata 304 corresponding to each image of the set of images 112 with a motion threshold. The motion threshold may be a predetermined value associated with the rate of motion of the one or more image sensors 104. For example, the motion threshold may be set based on multiple observations related to the relationship between the amount of blurring in the set of images 112 and the quality of 3D models constructed using the set of images 112, with respect to a user defined quality level. In case the rate of motion (such as acceleration, change in orientation, etc.) in the motion information is below or equal to the motion threshold, the corresponding image may be classified as the first quality image. In case the rate of motion in the motion information is above the motion threshold, the corresponding image may be classified as the second quality image.

In another embodiment, the NN model 108 may be configured to compare the value of the shutter speed parameter from the metadata 304 with the shutter speed threshold. In case the value of the shutter speed parameter is slower than or equal to the shutter speed threshold, the corresponding image may be classified as the first quality image. In case the value of the shutter speed parameter is faster than the shutter speed threshold, the corresponding image may be classified as the second quality image. In an embodiment, the NN model 108 may be configured to compare the value of the exposure parameter with the exposure threshold. In case the value of the exposure parameter is longer than the exposure parameter threshold, the corresponding image may be classified as the first quality image. In case the value of the exposure parameter is shorter than the exposure threshold, the corresponding image may be classified as the second quality image. In another embodiment, the NN model 108 may be configured to compare the value of the ISO sensitivity parameter with the ISO sensitivity threshold. In case the value of the ISO sensitivity parameter is less than or equal to the ISO sensitivity threshold, the corresponding image may be classified as the first quality image. In case the value of the ISO sensitivity parameter is greater than the ISO sensitivity threshold, the corresponding image may be classified as the second quality image. Similarly, the NN model 108 may be configured to compare the value of the gain parameter with a gain threshold. In case the value of the gain parameter is less than or equal to the gain threshold, the corresponding image may be classified as the first quality image. In case the value of the gain parameter is greater than the gain threshold, the corresponding image may be classified as the second quality image.

In an embodiment, the NN model 108 may classify an image of the one or more images 104 as the first quality image in case the rate of motion is less than the motion threshold, the value of the shutter speed parameter is slower than the shutter speed threshold, the value of an exposure parameter is longer than the exposure threshold, the value of the ISO sensitivity parameter is less than the ISO sensitivity threshold, and the value of the gain parameter is less than the gain threshold. In another embodiment, the NN model 108 may classify an image of the one or more images 104 as the first quality image in case at least one of the rate of motion is less than the motion threshold, the value of the shutter speed parameter is slower than the shutter speed threshold, the value of an exposure parameter is longer than the exposure threshold, the value of the ISO sensitivity parameter is less than the ISO sensitivity threshold, or the value of the gain parameter is less than the gain threshold.

At 302C, a set of images may be determined. The circuitry 202 may determine the first set of images 116 from the received set of images 112. The circuitry 202 may determine first set of images 116 based on the application of the NN model 108 on the received metadata 304 (such as motion information of the one or more image sensors 104) associated with each of the set of images 112. Each of the determined first set of images 116 may be classified as the first quality image. For example, the first set of images 116 may include one or more images from the set of images 112 that may be labelled as the first quality image.

At 302D, image alignment may be performed. In an embodiment, the circuitry 202 may identify a second image corresponding to the first image. The circuitry 202 may identify the second image from the set of images 112 based on the application of the NN model 108 on the received metadata associated with each of the set of images 112. The second image may be obtained from a second image sensor of the one or more image sensors 104 different from the first image sensor that outputs the first image. In an example, the first image and the second image may be images of the subject 114 from different viewpoints. The circuitry 202 may align the second image with the first image based on a first metadata (such as a first motion vector) associated with the first image and a second metadata (such as a second motion vector) associated with the second image. The motion information may enable accurate and robust alignment between images for the construction of the 3D model 118 of the subject 114.

At 302E, the 3D model (such as the 3D model 118) may be constructed. The circuitry 202 may be configured to construct the 3D model 118 of the subject 114 associated with the 3D physical space. The 3D model 118 may be a 3D graphical model that may resemble the actual shape of the subject 114. For example, the circuitry 202 may render the 3D model 118 of the subject 114 from a 3D mesh that may use polygonal surfaces to define a shape and geometry of the subject 114. The 3D model 118 of the subject 114 may realistically represent the surface features of the subject 114.

The 3D model 118 may be constructed based on the first set of images 116 that correspond to the first image quality. For example, the first quality image may include a lower amount of blur compared to the second quality image. To construct the 3D model 118 of the subject 114, the circuitry 202 may perform a pipeline of operations. The pipeline of operations may include, but are not limited to, a three-dimensional (3D) reconstruction operation, and a meshing operation. It may be noted that the pipeline of operations for the generation of the 3D model 118 may further include sub-operations, which are omitted from the disclosure for the sake of brevity.

To construct the 3D model 118 of the subject 114, the circuitry 202 may be configured to perform the 3D reconstruction. In the 3D reconstruction, the circuitry 202 may be configured to determine a geometric relationship behind all observations provided by the first set of images 116 and infer a rigid scene structure (i.e. 3D points) with a pose (i.e. a position and an orientation) of the subject 114. Based on inference of the rigid scene structure, the circuitry 202 may further retrieve one or more depth values of each pixel in the first set of images 116.

In some embodiments, the circuitry 202 may match a set of features in each image of the first set of images 116. Once the set of features are matched, the circuitry 202 may create three dimensional points in the 3D space. The created points in the 3D space may also contain color information. The circuitry 202 may repeat the same process for each of the set of features, and may create the 3D points in the 3D space for each matched feature. Such points in the 3D space may create a sparse point cloud and form the rigid scene structure. The circuitry 202 may convert the sparse point cloud into a dense point cloud based on the retrieved depth value for each pixel. The circuitry 202 may construct the 3D model 118 of the subject 114 based on the dense point cloud. Further, based on the execution of the 3D reconstruction, the circuitry 202 may be configured to perform the meshing operation (such as polygonal meshing or volumetric meshing). In the meshing operation, the circuitry 202 may be configured to generate a dense geometric surface representation (i.e. the 3D model) of the subject 114. In an embodiment, the subject 114 may not be present in the 3D physical space. In such scenarios, the constructed 3D model associated with the 3D physical space may correspond to a volumetric capture of the 3D physical space.

At 302F, a 3D model rendering operation may be performed. The circuitry 202 may be configured to render the constructed 3D model 118 of the subject 114 (or the volumetric capture of the 3D physical space) on the display screen 206A. In some embodiments, the constructed 3D model 118 may be textured to generate a textured 3D model of the subject 114 (or the volumetric capture of the 3D physical space) before rendering. The circuitry 202 may generate the textured 3D model by UV mapping of a texture map (extracted from the first set of images 116) on the constructed 3D model 118. The UV mapping may correspond to a process of projecting one or more 2D images (texture map) onto a surface of the constructed 3D model 118 of the subject 114. In some embodiments, the circuitry 202 may compress the textured 3D model for rendering (and/or exporting, and/or archiving, and/or transmission) of the textured 3D model. In some exemplary scenarios, the constructed 3D model 118 (or the textured 3D model) may be rendered in a virtual reality (VR) or augmented reality (AR) environment to represent the subject 114. The applications of the constructed 3D model 118 may include, but are not limited to, animations in video games, visual effects (VFX), computer-generated imagery (CGI), and 3D model-based video conferencing.

Although the exemplary operations from 302A to 302F are illustrated as discrete operations, such as the data acquisition, the NN model application, the set of images determination, the image alignment, the 3D model construction, and 3D model rendering operation, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 4:
FIG. 4 is a diagram that illustrates an exemplary graph of motion information associated with a first image sensor, in accordance with an embodiment of the disclosure.

FIG. 4 is a diagram that illustrates an exemplary graph of motion information associated with a first image sensor, in accordance with an embodiment of the disclosure. FIG. 4 is explained in conjunction with elements from FIGS. 1, 2, and 3. With reference to FIG. 4, there is shown an exemplary graph 400 between values captured by the IMU 106 associated with a first image sensor of the one or more image sensors 104 over a period of time. With reference to FIG. 4, there is further shown a first point 402 and a second point 404 on a vertical axis (Y-axis) of the graph 400. The first point 402 and the second point 404 may represent the motion threshold in either direction of the horizontal axis (X-axis). With reference to FIG. 4, there is further shown a set of images 406 that may be captured by the first image sensor of the one or more image sensors 104 over the period of time.

With reference to the graph 400, the vertical axis may represent the values captured by an IMU 106 associated (or installed) with the first image sensor of the one or more image sensors 104 and the horizontal axis may represent the time (in milliseconds). For example, the vertical axis may represent the rate of motion of the first image sensor (for example, in milli-meter/millisecond). In a stable position (for example, a resting position) of the first image sensor, the value captured by the IMU (or the rate of motion) may be '0' or close to '0'. One or more images captured at the time when the value of the rate of motion is '0' may not be blurred, and therefore may correspond to the first quality image.

In an embodiment, in case the first image sensor of the one or more image sensors 104 is in motion in a first direction or is in acceleration, the values of the IMU 106 on the graph 400 may be positive. In case the first image sensor is in motion in a second direction or in deceleration, the values of the IMU 106 on the graph 400 may be negative. In an embodiment, the graph 400 may include curves representing motion information (such as motion vectors) from multiple IMUs 106 associated with different image sensors of the one or more image sensors 104. In another embodiment, as shown in FIG. 4, the graph 400 may include curves representing motion information (such as motion vectors) corresponding to different axes of motion (such as pitch, yaw, and roll) of a single IMU 106 associated with the first image sensor of the one or more image sensors 104. The motion threshold may be set for both the positive and negative values. For example, the first point 402 may correspond to the motion threshold for positive values captured by the IMU 106 and may be set at +1000 mm/ms. In another example, the second point 404 may correspond to the motion threshold for negative values captured by the IMU 106 and may be set at −1000 mm/ms.

In an example, a first image 406A of the set of images 406 may be captured at a first time instant (for example, at 17000 ms), a second image 406B of the set of images 406 may be captured at a second time instant (for example, at 20000 ms), a third image 406C of the set of images 406 may be captured at a third time instant (for example, at 22500 ms), and a fourth image 406D of the set of images 406 may be captured at a fourth time instant (for example, at 26000 ms). As shown in the graph 400, the rate of motion of the first image sensor may be above the motion threshold (indicated by the first point 402 and the second point 404) during the first time instant (for example, at 17000 ms) of capture of the first image 406A. Accordingly, the first image 406A of the set of images 406 may be blurred. The rate of motion of the first image sensor may be below the motion threshold during the second time instant (for example, at 20000 ms) of capture of the second image 406B. Accordingly, the second image 406B of the set of images 406 may not be blurred. Similarly, the third image 406C of the set of images 406 may be blurred and the fourth image 406D of the set of images 406 may not be blurred.

The circuitry 202 may receive the set of images 406 and the metadata associated with the each of the set of images 406. The metadata may be provided as an input to the NN model 108. The NN model 108 may classify the second image 406B and the fourth image 406D (i.e. the first set of images) as the first quality image based on the motion threshold, and may classify the first image 406A and the third image 406C as the second quality image based on the motion threshold. For example, the second image 406B and the fourth image 406D may include a lower amount of blur compared to the first image 406A and the third image 406C.

In an embodiment, the NN model 108 may determine a first time period in which the rate of motion of the first image sensor may be above the motion threshold. In such scenario, the NN model 108 may classify all the images of the set of images 406 captured during the first time period as the second quality image. The NN model 108 may determine a second time period in which the rate of motion of the first image sensor may be below the motion threshold. In such scenario, the NN model 108 may classify all the images of the set of images 406 captured during the second time period as the first quality image. By way example and with reference to FIG. 4, the NN model 108 may classify all the images captured by the first image sensor during the time period between 23500 ms and 27500 ms as the first quality image, and may classify all the images captured by the first image sensor during the time period between 27500 ms and 30000 ms as the second quality image. Based on the classification of the NN model 108, the circuitry 202 may construct the 3D model 118 based on the second image 406B and the fourth image 406D (i.e. the first set of images) classified as the first quality image. The details about the construction of the 3D model 118 are provided, for example, in FIG. 3.

Figure 5:
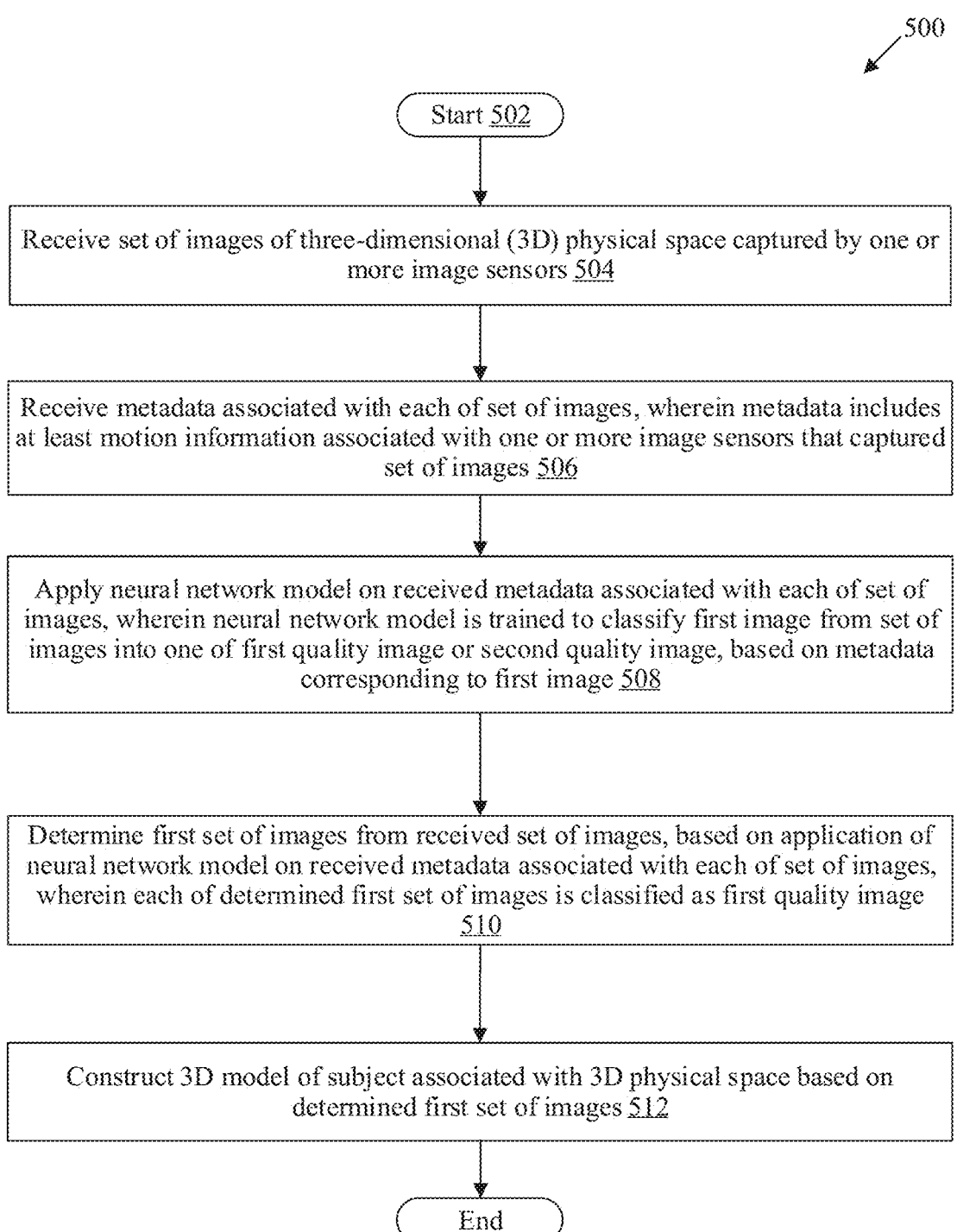
FIG. 5 is a flowchart that illustrates an exemplary method for three-dimensional (3D) reconstruction based on camera motion information, in accordance with an embodiment of the disclosure.

FIG. 5 is a flowchart that illustrates an exemplary method for three-dimensional (3D) reconstruction based on camera motion information, in accordance with an embodiment of the disclosure. FIG. 5 is explained in conjunction with elements from FIGS. 1, 2, 3, and 4. With reference to FIG. 5, there is shown a flowchart 500. The operations of the exemplary method may be executed by any computing system, for example, by the electronic device 102 of FIG. 1 or the circuitry 202 of FIG. 2. The operations of the flowchart 500 may start at 502 and may proceed to 504.

At 504, the set of images 112 of the three-dimensional (3D) physical space captured by the one or more image sensors 104 may be received. In at least one embodiment, the circuitry 202 may receive the set of images 112 of the three-dimensional (3D) physical space captured by the one or more image sensors 104 as described, for example, in FIGS. 1 and 3 (at 302A).

At 506, metadata associated with each of the set of images 112 may be received, wherein the metadata includes at least the motion information associated with the one or more image sensors 104 that captured the set of images 112. In at least one embodiment, the circuitry 202 may receive the metadata associated with each of the set of images 112, as described, for example, in FIGS. 1 and 3 (at 302A).

At 508, the NN model 108 may be applied on the received metadata associated with each of the set of images 112, wherein the NN model 108 may be trained to classify the first image 112A from the set of images 112 into one of the first quality image or the second quality image based on the metadata corresponding to the first image 112A. In at least one embodiment, the circuitry 202 may apply the NN model 108 on the received metadata associated with each of the set of images 112, as described, for example, in FIGS. 3 (at 302B), and 4.

At 510, the first set of images 116 from the received set of images 112 may be determined, based on the application of the NN model 108 on the received metadata associated with each of the set of images 112, wherein each of the determined first set of images 116 may be classified as the first quality image. In at least one embodiment, the circuitry 202 may determine the first set of images 116 from the received set of images 112, as described, for example, in FIGS. 3, and 4.

At 512, the 3D model 118 of the subject 114 associated with the 3D physical space may be constructed based on the determined first set of images 116. In at least one embodiment, the circuitry 202 may construct the 3D model 118 of the subject 114 associated with the 3D physical space based on the determined first set of images 116, as described, for example, in FIG. 3. Control may pass to end.

Although the flowchart 500 is illustrated as discrete operations. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate an electronic device (e.g., the electronic device 102) for three-dimensional (3D) reconstruction based on camera motion information. The instructions may cause the machine and/or computer to perform operations that include receiving a set of images (e.g., the set of images 112) of a three-dimensional (3D) physical space captured by one or more image sensors (e.g., the one or more image sensors 104). The operations further include receiving metadata associated with each of the set of images. The metadata may include at least motion information associated with the one or more image sensors 104 that captured the set of images 112. The operations further include applying a neural network model (e.g., the NN model 108) on the received metadata associated with each of the set of images 112. The NN model 108 may be trained to classify a first image (e.g., the first image 112A) from the set of images 112 into one of a first quality image or a second quality image based on the metadata corresponding to the first image 112A. The operations further include determining a first set of images (e.g., the first set of images 116) from the received set of images 112 based on the application of the NN model 108 on the received metadata associated with each of the set of images 112. Each of the determined first set of images 116 may be classified as the first quality image. The operations further include constructing a 3D model (e.g., the 3D model 118) of a subject (e.g., the subject 114) associated with the 3D physical space based on the determined first set of images 116.

Certain embodiments of the disclosure may be found in an electronic device and a method for three-dimensional (3D) reconstruction based on camera motion information. Various embodiments of the disclosure may provide an electronic device (such as the electronic device 102) that may include circuitry (such as the circuitry 202) configured to receive a set of images (such as the set of images 112) of the three-dimensional (3D) physical space captured by one or more image sensors (such as the one or more image sensors 104). The circuitry 202 may further receive metadata (such as the metadata 304) associated with each of the set of images 112. The metadata 304 may include at least motion information associated with the one or more image sensors 104 that captured the set of images 112. The metadata 304 may be associated with each of the set of images 112 may be determined by one or more inertial measurement units (IMUs) (such as the one or more IMUs 106) associated with the one or more image sensors 104. The motion information may indicate the rate of motion of the first image sensor from the one or more image sensors 104 at a time of capture of a first image (such as the first image 112A) by the first image sensor.

In accordance with an embodiment, the circuitry 202 may apply a neural network (NN) model (such as the NN model 108) on the received metadata 304 associated with each of the set of images 112. The NN model 108 may be trained to classify the first image 112A from the set of images 112 into one of a first quality image or a second quality image based on the metadata 304 corresponding to the first image 112A. The first image 112A may correspond to the first quality image based on the rate of motion of the first image sensor being below the motion threshold. In another embodiment, the first image 112A may correspond to the second quality image based on the rate of motion of the first image sensor being above the motion threshold.

In accordance with an embodiment, the circuitry 202 may identify a second image corresponding to the first image 112A based on the application of the NN model 108 on the received metadata 304 associated with each of the set of images 112. The circuitry 202 may further align the identified second image with the first image 112A based on a first metadata associated with the first image 112A and a second metadata associated with the second image.

In accordance with an embodiment, the circuitry 202 may determine the first set of images 116 from the received set of images 112 based on the application of the NN model 108 on the received metadata 304 associated with each of the set of images 112. Each of the determined first set of images 116 may be classified as the first quality image. The circuitry 202 may further construct the 3D model 118 of the subject 114 associated with the 3D physical space based on the determined first set of images 116.

In accordance with an embodiment, the circuitry 202 may be further configured to control a set of imaging parameters related to the one or more image sensors 104. The set of imaging parameters may include at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation (a tilt or an orientation) parameter, or a deblur parameter.

In accordance with an embodiment, a value of the shutter speed parameter associated with the one or more image sensors 104 is less than the shutter speed threshold. In another embodiment, a value of the exposure parameter associated with the one or more image sensors 104 is greater than the exposure threshold. In another embodiment, a value of an ISO sensitivity parameter associated with the one or more image sensors 104 is less than the ISO sensitivity threshold. In another embodiment, a value of a gain parameter associated with the one or more image sensors 104 is less than the gain threshold.

In accordance with an embodiment, the constructed 3D model 118 associated with the 3D physical space corresponds to a volumetric capture of the 3D physical space.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. An electronic device, comprising:
   circuitry configured to:
   receive a plurality of images of a three-dimensional (3D) physical space captured by at least one image sensor;
   receive metadata associated with each image of the plurality of images, wherein the metadata includes motion information associated with the at least one image sensor;

apply a neural network model on the received metadata associated with each image of the plurality of images, wherein the neural network model is trained to classify, based on the metadata corresponding to a first image from the plurality of images, the first image into one of a first quality image or a second quality image;

compare, by the application of the neural network model, the motion information corresponding to each image of the plurality of images with a motion threshold, wherein the motion threshold is based on multiple observations of relationships between a blurring amount in the plurality of images and a quality of 3D models of the plurality of images, with respect to a user defined quality level;

classify, by the application of the neural network model, each image of the plurality of images into one of the first quality image or the second quality image based on the comparison;

determine a set of images from the plurality of images, based on the classification of each image of the plurality of images, wherein each image of the determined set of images is classified as the first quality image;

identify a second image from the determined set of images based on the application of the neural network model on the received metadata associated with each image of the determined set of images, wherein the second image corresponds to the first image;

align the identified second image with the first image based on the metadata associated with the first image and the metadata associated with the second image;

match a set of features of a third image of the determined set of images with a set of features of a fourth image of the determined set of images, wherein the third image is different from the fourth image;

generate a sparse point cloud based on the matched set of features of the third image with the set of features of the fourth image;

determine a rigid scene structure with a pose of a subject associated with the 3D physical space, wherein the pose includes a position of the subject and an orientation of the subject;

retrieve, based on the determined rigid scene structure, a depth value of each pixel in the determined set of images;

convert the generated sparse point cloud to a dense point cloud based on the depth value of each pixel in the determined set of images; and construct a 3D model of the subject associated with the 3D physical space based on the dense point cloud and the alignment of the identified second image with the first image.

2. The electronic device according to claim 1, wherein the metadata associated with each image of the plurality of images is determined by at least one inertial measurement unit (IMU) associated with the at least one image sensor.

3. The electronic device according to claim 1, wherein the motion information indicates a rate of motion of the at least one image sensor, at a time of capture of the first image by the at least one image sensor.

4. The electronic device according to claim 3, wherein the first image corresponds to the first quality image based on the rate of motion of the at least one image sensor that is below the motion threshold.

5. The electronic device according to claim 3, wherein the first image corresponds to the second quality image based on the rate of motion of the at least one image sensor that is above the motion threshold.

6. The electronic device according to claim 1, wherein the circuitry is further configured to control a set of imaging parameters related to the at least one image sensor, and the set of imaging parameters includes at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation parameter, or a deblur parameter.

7. The electronic device according to claim 1, wherein a value of a shutter speed parameter associated with the at least one image sensor is less than a shutter speed threshold.

8. The electronic device according to claim 1, wherein a value of an exposure parameter associated with the at least one image sensor is greater than an exposure threshold.

9. The electronic device according to claim 1, wherein a value of an ISO sensitivity parameter associated with the at least one image sensor is less than an ISO sensitivity threshold.

10. The electronic device according to claim 1, wherein a value of a gain parameter associated with the at least one image sensor is less than a gain threshold.

11. The electronic device according to claim 1, wherein the constructed 3D model associated with the 3D physical space corresponds to a volumetric capture of the 3D physical space.

12. An method, comprising:

In an electronic device:

receiving a plurality of images of a three-dimensional (3D) physical space captured by at least one image sensor;

receiving metadata associated with each image of the plurality of images, wherein the metadata includes motion information associated with the at least one image sensor;

applying a neural network model on the received metadata associated with each image of the plurality of images, wherein the neural network model is trained to classify, based on the metadata corresponding to a first image from the plurality of images, the first image into one of a first quality image or a second quality image;

comparing, by the application of the neural network model, the motion information corresponding to each image of the plurality of images with a motion threshold, wherein the motion threshold is based on multiple observations of relationships between a blurring amount in the plurality of images and a quality of 3D models of the plurality of images, with respect to a user defined quality level;

classifying, by the application of the neural network model, each image of the plurality of images into one of the first quality image or the second quality image based on the comparison;

determining a set of images from the plurality of images, based on the classification of each image of the plurality of images, wherein each image of the determined set of images is classified as the first quality image;

identifying a second image from the determined set of images based on the application of the neural network model on the received metadata associated with each image of the determined set of images, wherein the second image corresponds to the first image;

aligning the identified second image with the first image based on the metadata associated with the first image and the metadata associated with the second image;

matching a set of features of a third image of the determined set of images with a set of features of a fourth image of the determined set of images, wherein the third image is different from the fourth image;

generating a sparse point cloud based on the matched set of features of the third image with the set of features of the fourth image;

determining a rigid scene structure with a pose of a subject associated with the 3D physical space, wherein the pose includes a position of the subject and an orientation of the subject;

retrieving, based on the determined rigid scene structure, a depth value of each pixel in the determined set of images;

converting the generated sparse point cloud to a dense point cloud based on the depth value of each pixel in the determined set of images; and constructing a 3D model of the subject associated with the 3D physical space based on the dense point cloud and the alignment of the identified second image with the first image.

13. The method according to claim 12, wherein the metadata associated with each image of the plurality of images is determined by at least one inertial measurement unit (IMU) associated with the at least one image sensor.

14. The method according to claim 12, wherein the motion information indicates a rate of motion of the at least one image sensor, at a time of capture of the first image by the at least one image sensor.

15. The method according to claim 14, wherein the first image corresponds to the first quality image based on the rate of motion of the at least one image sensor being below the motion threshold.

16. The method according to claim 14, wherein the first image corresponds to the second quality image based on the rate of motion of the at least one image sensor being above the motion threshold.

17. The method according to claim 12, further comprising controlling a set of imaging parameters related to the at least one image sensor, wherein the set of imaging parameters includes at least one of a focus parameter, a field-of-view (FoV) parameter, a zoom parameter, an f-stop parameter, an exposure parameter, a shutter speed parameter, an aperture parameter, a gain parameter, a backlight parameter, a brightness parameter, a contrast parameter, a white balance parameter, a sharpness parameter, a ISO sensitivity parameter, a noise reduction parameter, a demosaic parameter, a denoise parameter, a color parameter, a high dynamic range (HDR) parameter, a rotation parameter, or a deblur parameter.

18. A non-transitory computer-readable medium having stored thereon, computer-executable instructions that when executed by an electronic device, causes the electronic device to execute operations, the operations comprising:

receiving a plurality of images of a three-dimensional (3D) physical space captured by at least one image sensor;

receiving metadata associated with each image of the plurality of images, wherein the metadata includes motion information associated with the at least one image sensor;

applying a neural network model on the received metadata associated with each image of the plurality of images, wherein the neural network model is trained to classify, based on the metadata corresponding to a first image from the plurality of images, the first image into one of a first quality image or a second quality image;

comparing, by the application of the neural network model, the motion information corresponding to each image of the plurality of images with a motion threshold, wherein the motion threshold is based on multiple observations of relationships between a blurring amount in the plurality of images and a quality of 3D models of the plurality of images, with respect to a user defined quality level;

classifying, by the application of the neural network model, each image of the plurality of images into one of the first quality image or the second quality image based on the comparison;

determining a set of images from the plurality of images, based on the classification of each image of the plurality of images, wherein each image of the determined set of images is classified as the first quality image;

identifying a second image from the determined set of images based on the application of the neural network model on the received metadata associated with each image of the determined set of images, wherein the second image corresponds to the first image;

aligning the identified second image with the first image based on the metadata associated with the first image and the metadata associated with the second image;

matching a set of features of a third image of the determined set of images with a set of features of a fourth image of the determined set of images, wherein the third image is different from the fourth image;

generating a sparse point cloud based on the matched set of features of the third image with the set of features of the fourth image;

determining a rigid scene structure with a pose of a subject associated with the 3D physical space, wherein the pose includes a position of the subject and an orientation of the subject;

retrieving, based on the determined rigid scene structure, a depth value of each pixel in the determined set of images;

converting the generated sparse point cloud to a dense point cloud based on the depth value of each pixel in the determined set of images; and constructing a 3D model of the subject associated with the 3D physical space based on the dense point cloud and the alignment of the identified second image with the first image.

* * * * *